United States Patent
Chou et al.

(10) Patent No.: US 8,886,011 B2
(45) Date of Patent: Nov. 11, 2014

(54) SYSTEM AND METHOD FOR QUESTION DETECTION BASED VIDEO SEGMENTATION, SEARCH AND COLLABORATION IN A VIDEO PROCESSING ENVIRONMENT

(71) Applicant: Cisco Technology, Inc., San Jose, CA (US)

(72) Inventors: Jim Chen Chou, San Jose, CA (US); Ananth Sankar, Palo Alto, CA (US); Sachin Kajarekar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 13/708,717

(22) Filed: Dec. 7, 2012

(65) Prior Publication Data
US 2014/0161416 A1 Jun. 12, 2014

(51) Int. Cl.
*H04N 5/92* (2006.01)
*H04N 9/79* (2006.01)

(52) U.S. Cl.
CPC ...................................... *H04N 9/79* (2013.01)
USPC .......................................... 386/246; 386/248

(58) Field of Classification Search
None
See application file for complete search history.

(56) References Cited

U.S. PATENT DOCUMENTS

| | | | |
|---|---|---|---|
| 5,572,246 A | 11/1996 | Ellis et al. | |
| 5,710,591 A | 1/1998 | Bruno et al. | |
| 5,953,439 A | 9/1999 | Ishihara et al. | |
| 6,377,995 B2 | 4/2002 | Agraharam et al. | |
| 7,165,029 B2 | 1/2007 | Nefian | |
| 7,209,883 B2 | 4/2007 | Nefian | |
| 7,454,342 B2 | 11/2008 | Nefian et al. | |
| 7,599,554 B2 | 10/2009 | Agnihotri et al. | |
| 7,870,574 B2 | 1/2011 | Kenyon et al. | |
| 2001/0042114 A1 | 11/2001 | Agraharam et al. | |
| 2003/0049592 A1* | 3/2003 | Park ............................ | 434/322 |

(Continued)

FOREIGN PATENT DOCUMENTS

| | | |
|---|---|---|
| EP | 1377057 | 1/2004 |
| EP | 1482736 | 12/2004 |

(Continued)

OTHER PUBLICATIONS

U.S. Appl. No. 13/469,886, filed May 11, 2012, entitled "System and Method for Joint Speaker and Scene Recognition in a Video/Audio Processing Environment," Inventors: Jim Chen Chou, et al.

(Continued)

*Primary Examiner* — William C Vaughn, Jr.
*Assistant Examiner* — Eileen Adams
(74) *Attorney, Agent, or Firm* — Patent Capital Group

(57) ABSTRACT

An example method is provided and includes receiving a video bitstream in a network environment; detecting a question in a decoded audio portion of a video bitstream; and marking a segment of the video bitstream with a tag. The tag may correspond to a location of the question in the video bitstream, and can facilitate consumption of the video bitstream. The method can further include detecting keywords in the question, and combining the keywords to determine a content of the question. In specific embodiments, the method can also include receiving the question and a corresponding answer from a user interaction, crowdsourcing the question by a plurality of users, counting a number of questions in the video bitstream and other features.

19 Claims, 6 Drawing Sheets

(56) References Cited

U.S. PATENT DOCUMENTS

| | | | |
|---|---|---|---|
| 2003/0212552 | A1 | 11/2003 | Liang et al. |
| 2004/0109587 | A1 | 6/2004 | Segawa et al. |
| 2005/0071519 | A1 | 3/2005 | Hart et al. |
| 2005/0086059 | A1* | 4/2005 | Bennett .................. 704/270 |
| 2006/0204060 | A1 | 9/2006 | Huang et al. |
| 2007/0098303 | A1 | 5/2007 | Gallagher et al. |
| 2008/0273116 | A1 | 11/2008 | Gentric |
| 2009/0210491 | A1 | 8/2009 | Thakkar et al. |
| 2010/0194881 | A1 | 8/2010 | Beal |
| 2012/0250761 | A1* | 10/2012 | Tong et al. ............. 375/240.05 |
| 2013/0226999 | A1* | 8/2013 | Sarieddine ................ 709/203 |
| 2013/0262369 | A1* | 10/2013 | Guanwardana et al. ....... 706/55 |
| 2013/0282698 | A1* | 10/2013 | Oztekin et al. ............. 707/722 |
| 2014/0040392 | A1* | 2/2014 | Sirota et al. ............... 709/206 |

FOREIGN PATENT DOCUMENTS

| | | |
|---|---|---|
| EP | 1798666 | 6/2007 |
| WO | WO 2004/081814 | 9/2004 |
| WO | WO 2006/130542 | 12/2006 |
| WO | WO 2007/036838 | 4/2007 |
| WO | WO 2008/004153 | 1/2008 |
| WO | WO 2008/102283 | 8/2008 |
| WO | WO 2013/170212 | 11/2013 |

OTHER PUBLICATIONS

U.S. Appl. No. 13/608,420, filed Sep. 10, 2012, entitled "System and Method for Improving Speaker Segmentation and Recognition Accuracy in a Media Processing Environment," Inventors: Sandipkumar V. Shah, et al.

U.S. Appl. No. 13/608,787, filed Sep. 10, 2012, entitled "System and Method for Enhancing Metadata in a Video Processing Environment," Inventors: Sandipkumar V. Shah et al.

Ahanger, et al., "A Survey of Technologies for Parsing and Indexing Digital Video," In Journal of Visual Communication and Image Representation, (Special Issue on Digital Libraries), Mar. 1996, vol. 7, No. 1, 35 pages; http://csce.uark.edu/~jgauch/library/Video-Segmentation/Ahanger.1996.pdf.

Boreczky et al., "A Hidden Markov Model Framework for Video Segmentation Using Audio and Image Features," Proceedings of the 1998 IEEE International Conference on Acoustics, Speech and Signal Processing (1998), Seattle, WA, 4 pages; http://citeseerx.ist.psu.edu/viewdoc/summary?doi=10.1.1.20.7646.

Dupont et al., "Audio-Visual Speech Modeling for Continuous Speech Recognition," IEEE Transactions on Multimedia, vol. 2, No. 3, Sep. 2000, 11 pages; http://ivizlab.sfu.ca/arya/Papers/IEEE/TransactMM/CD/DATA/00865479.PDF.

Gauch, et al., "Real time video scene detection and classification," Information Processing and Management 35 (1999) pp. 381-400; http://pnl.bwh.harvard.edu/pub/pdfs/99_Gauch_IPM.pdf.

Boakye, et al., "Any Questions? Automatic Question Detection in Meetings," Proceedings of the 11th Biannual IEEE Workshop on Automatic Speech Recognition and Understanding (ASRU Dec. 2009), Merano, Italy, pp. 485-489.

Chen, Longbin, et al., "Face Annotation for Family Photo Album Management," pp. 81,94, International Journal of Image and Graphics, vol. 3, No. 1, World Scientific Publishing Co., Singapore, SG, Jan. 2003.

Jurafsky et al., "Automatic Detection of Discourse Structure for Speech Recognition and Understanding," Proceedings of IEEE Workshop on Automatic Speech Recognition and Understanding, Dec. 14-17, 1997, Santa Barbara, CA, pp. 88-95.

Li, et al., "Analyzing and Predicting Question Quality in Community Question Answering Services," WWW '12 Companion Proceedings of the 21st international conference companion on World Wide Web (Apr. 16-20, 2012), Lyon, France, pp. 775-782.

Lin, et al., "Question-driven segmentation of lecture speech text: Towards intelligent e-learning systems," Abstract, Journal of the American Society for Information Science and Technology, vol. 59, Issue 2, pp. 186-200, Jan. 15, 2008.

PCT Jul. 31, 2013 International Search Report and Written Opinion of the International Searching Authority from International Application No. PCT/2013/040650.

Piechocki, et al., "PDA-BCJR Algorithm for Factorial Hidden Markov Models With Application to MIMO Equalisation," 14th European Signal Processing Conference (EUSIPCO 2006), Florence, Italy, Sep. 4-8, 2006, 5 pages; http://citeseerx.ist.psu.edu/viewdoc/summary?doi=10.1.1.122.672.

Sidiropoulos et al., "Multi-Modal Scene Segmentation Using Scene Transition Graphs," ACM International Conference on Multimedia MM'09, Oct. 19-24, 2009, Beijing, China, 4 pages; http://citeseerx.ist.psu.edu/viewdoc/summary?doi=10.1.1.178.2947.

SMPTE Technology Committee C24 on Video Compression Technology, SMPTE Draft Standard for Television, Proposed SMPTE Standard for Television: VC-1 Compressed Video Bitstream Format and Decoding Process (Aug. 23, 2005).

Tritschler, et al., "Improved Speaker Segmentation and Segments Clustering Using the Bayesian Information Criterion," Sixth European Conference on Speech Communication and Technology EUROSPEECH'99 (Sep. 5-9, 1999), pp. 679-682, Budapest, Hungary http://citeseerx.ist.psu.edu/viewdoc/summary?doi=10.1.1.72.905.

Vazquez-Reina, et al., "Multiple Hypothesis Video Segmentation from Superpixel Flows," 11th European Conference on Computer Vision, Heraklion, Crete, Greece, Sep. 5-11, 2010; Lecture Notes in Computer Science, vol. 6315/2010, pp. 268-281.

Viola, Paul, et al., "Rapid Object Detection Using a Boosted Cascade of Simple Features," Proceedings of IEEE Computer Society Conference on Computer Vision and Pattern Recognition, Dec. 8-14, 2001.

Wang, et al., "Exploiting Salient Patterns for Question Detection and Question Retrieval in Community-based Question Answering," Proceedings of the 23rd International Conference on Computational Linguistics (COLINGO), pp. 1155-1163, Beijing, Aug. 2010.

Xavier Anguera Miró, PhD Thesis Proposal, "Robust Speaker segmentation and clustering for Meetings," University of Berkeley, 2005, 22 pages; http://www1.icsi.berkeley.edu/~xanguera/papers/thesis_proposal.pdf.

Zechner, "Automatic Generation of Concise Summaries of Spoken Dialogues in Unrestricted Domains," SIGIR'01, Sep. 9-12, 2001, New Orleans, Louisiana, USA.

Zhai, et al., "Video Scene Segmentation Using Markov Chain Monte Carlo," IEEE Transactions on Multimedia, vol. X, No. Y, 2005, 11 pages; http://citeseerx.ist.psu.edu/viewdoc/summary?doi=10.1.1.79.7216.

Zhiyong Wu et al., "Multi-level Fusion of Audio and Visual Features for Speaker Identification," Proceedings of International Conference on Biometrics 2006, Lecture Notes in Computer Science 3832, pp. 493-499, 2006, Hong Kong; http://citeseerx.ist.psu.edu/viewdoc/summary?doi=10.1.1.107.6879.

USPTO Aug. 4, 2014 Non-Final Office Action from U.S. Appl. No. 13/469,886.

* cited by examiner

SYSTEM AND METHOD FOR QUESTION DETECTION BASED VIDEO SEGMENTATION, SEARCH AND COLLABORATION IN A VIDEO PROCESSING ENVIRONMENT

TECHNICAL FIELD

This disclosure relates in general to the field of video/audio processing and, more particularly, to a system and a method for question detection based video segmentation, search, and collaboration in a video processing environment.

BACKGROUND

The ability to effectively gather, associate, and organize information presents a significant obstacle for component manufacturers, system designers, and network operators alike. As new media content analytics platforms and technologies become available, new protocols should be developed in order to leverage the use of these emerging platforms. With the emergence of high bandwidth networks and devices, enterprises could use global collaboration through creation and storage of videos, and personalization of connections between customers, partners, employees, and students through recordings of organizational communications, video conferences, and training sessions, as well as through user-generated video content. Widespread use of video and audio in turn drives advances in technology for video/audio processing, video creation, uploading, searching, and viewing.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes receiving a video bitstream in a network environment; detecting a question in a decoded audio portion of the video bitstream; and marking a segment of the video bitstream with a tag. As used herein, the term "tag" can include any suitable identifier, insignia, or metadata label (e.g., including any appropriate keyword, term, symbol, numeral, or other identifying marks, which may be proprietary in nature, etc.). The tag may correspond to a location of the question in the video bitstream, and it can facilitate consumption of the video bitstream. "Consuming" in this context can include searching, navigating through, viewing, listening to, manipulating, reviewing, processing, and otherwise using, the video bitstream. The method can further include detecting keywords in the question, and combining the keywords to determine a content of the question. In specific embodiments, the method can also include receiving the question and a corresponding answer from a user interaction, crowdsourcing the question by a plurality of users, and counting a number of questions in the video bitstream to gauge a level of interest for the video.

In a specific embodiment, the method can include receiving a search query for the question and returning the segment marked with the question. The question may be correlated to other questions with similar keywords, and a plurality of segments corresponding to the question and the other questions may also be returned. In some embodiments, an answer to the question may be correlated to one or more other answers, and another plurality of segments corresponding to the answer and the one or more other answers may also be returned. The method may include various other features in different embodiments.

Example Embodiments

Figure 1:
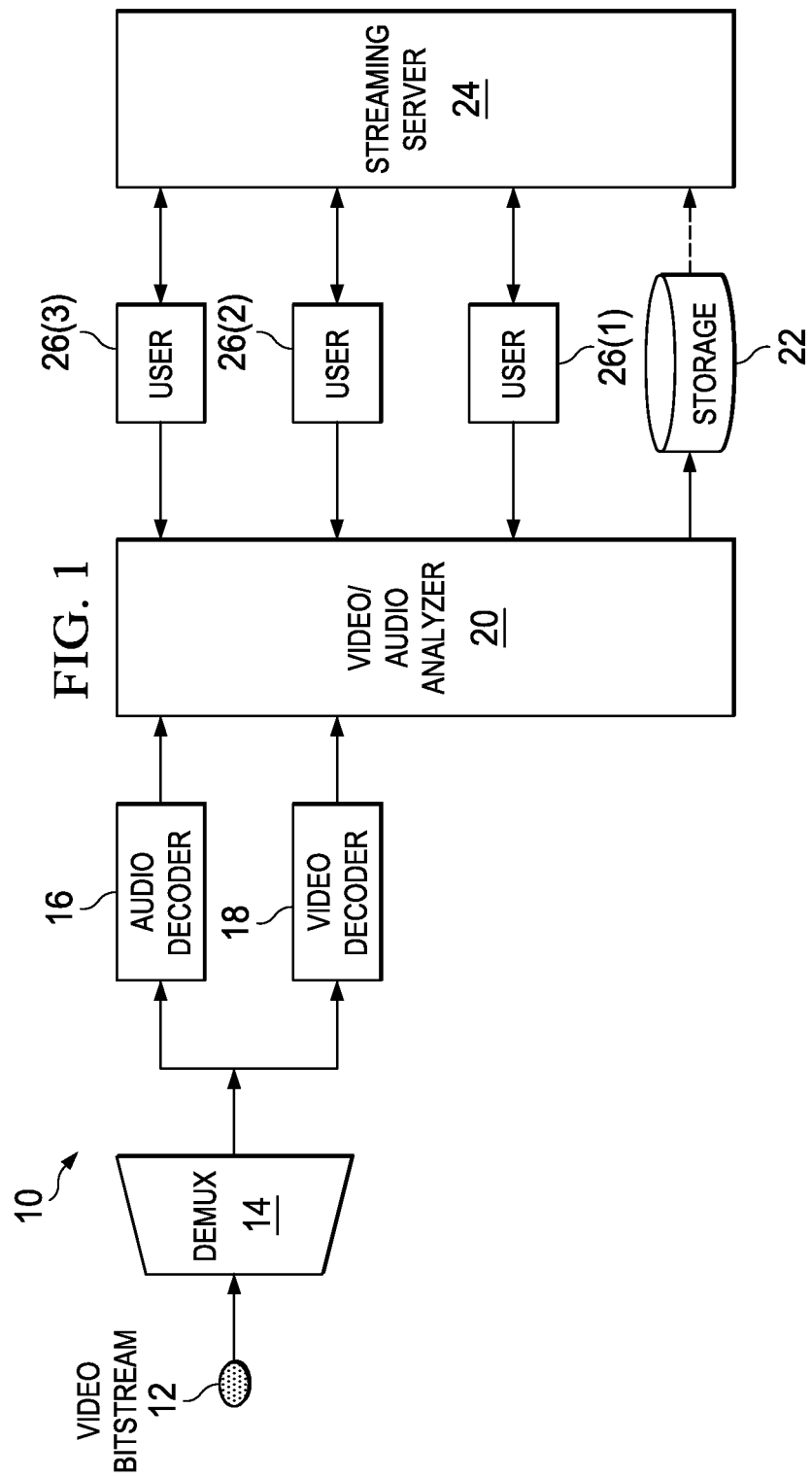
FIG. 1 is a simplified block diagram illustrating a media processing system for question detection based video segmentation, search and collaboration in a video processing environment in accordance with one embodiment of the present disclosure.

Turning to FIG. 1, FIG. 1 is a simplified block diagram illustrating a media processing system 10 for question detection based video segmentation, search, and collaboration in a video processing environment in accordance with one example embodiment. Media processing system 10 includes a video bitstream 12 that can be split by a demultiplexer ("demux") 14 into an audio portion (comprising sound without corresponding visual images) and a video portion (comprising moving visual images, without corresponding sound). As used herein, the term "video bitstream" can include a structured or unstructured sequence of bits that forms a coded representation of video data (e.g., embodied in a video file), which can include audio and corresponding moving visual images.

The audio portion may be sent to an audio decoder 16 that may decode (e.g., convert digital signal to analog signal) the audio portion and forward the decoded audio portion to a video/audio analyzer 20. The video portion may be sent to a video decoder 18 that may decode the video portion and forward the decoded video portion to video/audio analyzer 20. Video/audio analyzer 20 may detect questions in the decoded audio portion and process the decoded audio and video portions accordingly. As used herein, the term "question" includes an expression of inquiry that invites or calls for a reply. The processed decoded audio portion and video portion may be recombined, and encoded into a processed bitstream and sent to a storage 22, from where the processed bitstream may be streamed through a streaming server 24 to users 26(1)-26(3). User interactions from users 26(1)-26(3) may be received at video/audio analyzer 22, which may process video bitstream 12 accordingly.

As used herein, the term "user" can include applications (e.g., web browsers) and client devices such as computers, laptops, mobile phones, thin clients, etc. that are configured with suitable portals to enable playing video bitstream 12 and viewing the corresponding video in a human-friendly format (e.g., on a display screen). The user may be associated with a human viewer who views the video, and interacts with the video through "user interactions," which can include mouse clicks, keyboard entries, joystick movements, and such other actions. Merely for ease of illustration, and not as a limitation, three users 26(1)-26(3) are shown in the FIGURE. Any number of users may be included within the broad scope of the embodiments.

For purposes of illustrating the techniques of media processing system 10, it is important to understand the information that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Visual communications systems provide the ability to record events (e.g., conferences, meetings, etc.) to a content server in the form of video (or audio) files. In some scenarios, the events can be streamed live to interested people who do not want to participate at the physical venues of the events. Alternatively, the recorded events can be viewed later, either by streaming or downloading the video files in a variety of formats as specified by the content creators who recorded the events. Some visual communications systems allow users to access the video files over a graphical user interface (GUI) on the content server. The GUI can facilitate browsing and searching the video files through suitable browsers and search queries.

Some visual communications systems use speech recognition to detect keywords in the video files and facilitate searching according to the keywords. Such systems can recognize dialogues, including questions therein. In a general sense, question detection can be useful for event indexing and summarization, among other uses. For example, information about the presence of questions can be used to make more coherent summaries, detect action items, and generally improve off-line event browsing and searching.

Additionally, automatic question detection can serve information exchange among a community of users. For example, in community question answering (CQA) services (e.g., frequently asked questions (FAQ) forums, Yahoo!Answers, etc.), people tend to ask and answer questions to seek information and share knowledge. Currently, CQA services extend to online content, where certain websites provide the ability to type questions, share answers, search for specific questions and review a list of relevant answers. Such online CQA services typically include typed content, rather than videos.

Different mechanisms exist to enable question detection. For example, in the CQA context (involving typed content), state-of-the-art question detection mechanisms include vector space model, language model, Okapi model, translation model, syntactical tree searching model, etc. Audio based question detection mechanisms involve analyzing lexico-syntactic features (e.g., related to words and syntax, such as 'what,' 'do you,' etc.), turn related features (e.g., utterance length, turn taking in conversations between two people, etc.), and pitch related features (e.g., pitch at the end of a question may be different from the pitch at the end of a statement). Various other mechanisms for question detection may be used in visual communications systems, in general.

However, in such systems, apart from the keywords used in the questions, the questions themselves are not used as search tools (or search queries). For example, a search query for a specific question may not return any relevant video files. In some cases, the video files relevant to specific keywords in the question may be returned. The video files retrieved thus may or may not be relevant to the specific question (for example, the search results may include video files that include the keywords in statements and other utterances irrelevant to the specific question). Thus, the search results may not be entirely relevant when the query of interest is the specific question itself.

Some visual communications systems partition videos into segments (e.g., portions) that may be searched and/or individually streamed out to users. Interesting portions in the video often correspond to the portions where questions are asked. However, existing methods for video segmentation may be based on speaker segmentation (e.g., segmenting based on speaker changes) and/or scene recognition (e.g., segmenting based on scene boundaries), rather than question detection. There are currently no mechanisms to partition videos into segments according to questions found therein.

Media processing system 10 is configured to address these issues (and others) in offering a system and method for question detection based video segmentation, search, and collaboration in a video processing environment. Embodiments of media processing system 10 may detect one or more questions in the audio portion of video bitstream 12, and mark segments of video bitstream 12 with tags corresponding to locations of the questions. As used herein, the term "marking" includes labeling, indicating, signing, tagging, characterizing, denoting, designating, specifying, highlighting, or otherwise identifying. The segments may be coded as I-frames to enable random access.

As used herein, the term "I-frame" can include a single frame (static image at an instant in time) of digital video content that is independent of the preceding and succeeding frames, and that can store sufficient data to display the frame. Typically, I-frames may be interspaced with B-frames (highly compressed video that uses information from both previous and subsequent frames for data reference) and P-frames (compressed video that uses data from previous frames for decompression) in a compressed video. The I-frame is an intra-coded picture that is effectively a fully specified picture (like a conventional static image file). The more I-frames are contained in a video, the better the quality of the video.

The tags can be used to consume the video bitstream suitably. For example, the tags can facilitate navigating to the questions when video bitstream 12 is played on a suitable portal at users 26(1)-26(3). In yet another example, the tags can facilitate searching the video bitstream (e.g., based on detected questions, corresponding answers, or other questions and answers that may be associated with the detected questions and corresponding answers). In various embodiments, question detection may enable efficient searches for video segments that have been segmented according to questions found therein. In various embodiments, video segmentation, search and collaboration may be based on processing of the accompanying speech signal (e.g., audio). In some embodiments, questions may be detected by combining speech recognition algorithms with pitch change detection algorithms in a probabilistic framework.

As an example, words that form the beginning of a question (e.g., how, what, when, where, etc) may be stored in a repository (e.g., in storage 22) and a speech recognition system may search for one of the words that belong in the repository as a start of a phrase. Further, the end of the phrase may have a change in pitch, which is a common characteristic of questions. Various other mechanisms for question detection may be used within the broad scope of the embodiments. In various embodiments, off-line viewers may be able to watch recorded events at a later time and view only those portions relevant to the questions and skip the rest.

Turning to the infrastructure of media processing system 10, the various elements may include suitable components for video/audio storage (e.g., storage 22), video/audio processing (e.g., demux 14, audio decoder 16, video decoder 18, video/audio analyzer 20), and information retrieval functionalities (e.g., streaming server 24). Other examples of such components include servers with repository services that store digital content, indexing services that allow searches, client/server systems, disks, image processing systems, etc.

In some embodiments, some components of media processing system 10 may be located on a single network element; in other embodiments, components of media processing system 10 may be located on more than one network element, dispersed across various networks. As used herein in this Specification, the term "network element" is meant to encompass computers, video recording devices (e.g., cameras) configured with suitable network interfaces, network appliances, servers, routers, switches, gateways, bridges, load balancers, firewalls, processors, modules, or any other suitable device, proprietary component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information.

Media processing system 10 may support multi-media content, enable link representation to local/external objects, support advanced search and retrieval, support annotation of existing information, etc. Streaming server 24 may be configured to accept search queries, and perform one or more searches of video content stored in storage 22, and provide the search results to one or more users 26(1)-26(3) that generated the search queries. Media processing system 10 may facilitate integrating image and video processing and understanding, speech recognition, distributed data systems, networks and human-computer interactions in a comprehensive manner. Content based indexing and retrieval algorithms may be implemented in various embodiments of media processing system 10 to enable users 26(1)-26(3) to interact with videos.

In some embodiments, various elements of media processing system 10 can be included in a network. The network topology can include any number of servers, virtual machines, switches (including distributed virtual switches), routers, and other nodes inter-connected to form a large and complex network. A "node" may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Media processing system 10 may include a configuration capable of TCP/IP communications for the electronic transmission or reception of data packets in a network. Media processing system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

The network environment may be configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network.

In some embodiments, a communication link in media processing system 10 may represent any electronic link within a single device. In other embodiments, the communication link can represent any electronic link supporting a LAN environment such as, for example, cable, Ethernet, wireless technologies (e.g., IEEE 802.11x), ATM, fiber optics, etc. or any suitable combination thereof. In yet other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

In various embodiments, demux 14 can include any device (or combination of devices) that takes a single input signal (e.g., video bitstream 12) and separates the input signal into one or more of many data-output-lines (e.g., audio, video, subtitles, etc.). Demux 14 can include various hardware and software, including format container handlers, that separate video bitstream 12 and supply the audio portion and video portion to audio decoder 16 and video decoder 18, respectively. Examples of demux 14 include Microsoft AVI splitter, Haali Media splitter (demultiplexes MPEG-4, MPEG transport stream and Matroska files), FLV splitter (demultiplexes Flasg video files), Gabest splitter (demultiplexes MPEG-4, etc.), etc.

In various embodiments, audio decoder 16 and video decoder 18 can decode the audio portion and video portion, respectively, of video bitstream 12, such that the original information can be retrieved therefrom. In some embodiments, audio decoder 16 and video decoder 18 may be software, comprising one or more libraries and a command-line front end. In other embodiments, audio decoder 16 and video decoder 18 may be implemented in hardware (e.g., one or more semiconductor chips) that combine decoding functions with other suitable functions, such as digital signal processing, converters, network interface, etc.

In various embodiments, video/audio analyzer 20 may include various software and hardware for performing the operations described herein. In some embodiments, video/audio analyzer 20 may be implemented on a single component (e.g., a semiconductor chip); in other embodiments, video/audio analyzer 20 may be implemented on multiple components within a single device (e.g., camcorder), or multiple devices (e.g., over a network). For example, video/audio analyzer 20 may include a search function that can enable searching for video segments having a specific question. The search function can be implemented as part of streaming server 24 in some embodiments.

Figure 2:
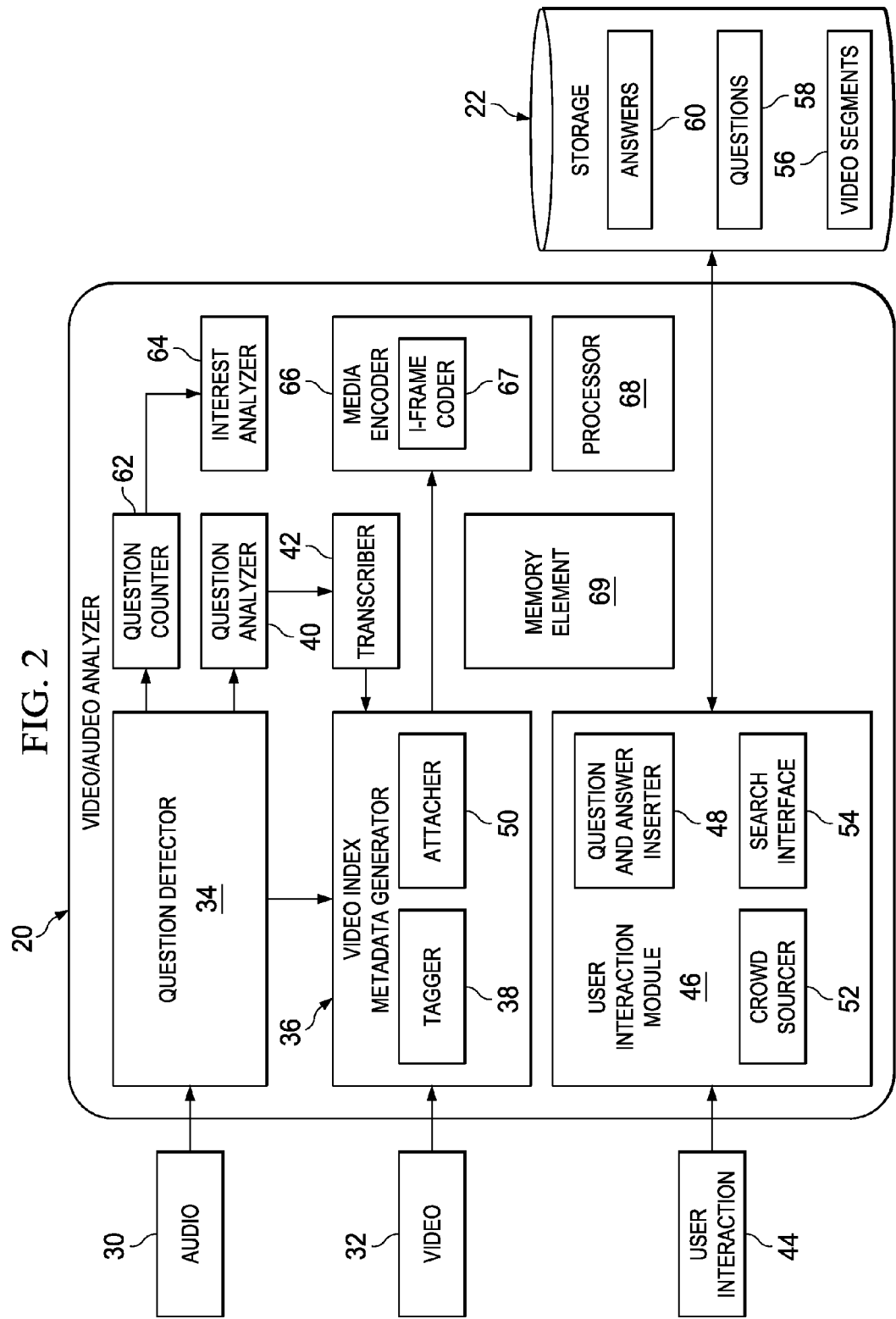
FIG. 2 is a simplified block diagram illustrating example details of an embodiment of the media processing system.

Turning to FIG. 2, FIG. 2 is a simplified block diagram illustrating example details of video/audio analyzer 20 according to an embodiment of media processing system 10. Audio signal 30, comprising the decoded audio portion of video bitstream 12, and video signal 32, comprising the decoded video portion of video bitstream 12, may be received at video/audio analyzer 20. Audio signal 30 may be processed by a question detector 34.

In various embodiments, question detector 34 may execute suitable algorithms to detect questions. For example, question detector 34 may use lexico-syntactic features and pitch related features to detect questions in audio signal 30. The detected questions, along with their locations (e.g., question 1 detected at 0:34 secs., etc.) may be provided to a video index metadata generator 36. As used herein, the term "location" used with reference to a question indicates a relative time of occurrence of the question in the video represented by video bitstream 12. For example, question 1 may occur 0:05 secs from the start of the video; and question 2 may occur 0:10 secs from the start of the video. Question 1 may be said to be located at 0:05, and question 2 may be said to be located at 0:10.

A tagger 38 in video index metadata generator 36 may insert tags in video signal 32 corresponding to the respective locations of the detected questions. Video signal 32 may be partitioned into segments based on the tag. For example, each segment may include one tag. In various embodiments, the segment may be bounded by the tag—a tag may indicate a beginning of a segment; the segment may continue until the next tag, which indicates the beginning of the next segment, and so on. In other embodiments, each segment may include multiple tags.

In some embodiments, tags may indicate information apart from questions also, such as keywords, speaker identities, etc. The segments may be grouped according to the tags. For example, a specific video segment tagged for a question (e.g., bounded by the question tags) may overlap with other segments tagged for keywords (e.g., bounded by the keyword tags). Various other partitioning mechanisms are included within the broad scope of the embodiments.

Each tag corresponding to a question may include an identifying label (e.g., question A), a keyword (e.g., keyword used in the question), a mark (e.g., triangle, arrow, a color coded bar, etc.), the question itself (e.g., transcribed suitably), or any other identifying mark associating the question with a relative time of occurrence of the question. In some embodiments, the tag may be inserted into the metadata of video bitstream 12. In a general sense, the tags can enable indexing of video files according to the questions therein.

Video/audio analyzer 20 may also include a question analyzer 40 that can detect keywords in audio signal 30 and combine the keywords to determine the contents of the questions. In some embodiments, question analyzer 40 may automatically determine what the questions are about by combining question words such as "Why," "What," How," etc. with keywords that are detected in the question. For example, detected keywords may be related to event topics, speakers, etc.

A transcriber 42 may transcribe the questions into text form. In various embodiments, transcriber 42 may include a speech recognition system to transcribe the questions with some level of confidence. The transcribed questions may be fed to video index metadata generator 34. Tagger 38 may tag video signal 32 with tags corresponding to the transcribed questions. In various embodiments, transcriber 42 may be an application in video/audio analyzer 20 configured to enable the operations describe herein.

In a specific example, a question that seeks information about a company's product during a shareholder meeting may be analyzed. The question may be "when is the company's new product launch?" Keywords pertaining to the product may be detected and question analyzer 40 may associate the question with a product launch date. The video segment including the question may be tagged accordingly. Any subsequent search query for the product launch date may pull up the specific video segment including the question. The portal displaying the video may be configured to also display the transcribed question on the portal at the location of the question (e.g., when the frames including the video segment having the question is displayed, the transcribed question may appear on the screen as moving text, within in a text box, within a callout, or in other suitable formats).

In various embodiments, video/audio analyzer 20 may receive user interaction 44 from one or more users at a user interaction module 46. User interaction module 46 may include a question and answer (Q&A) inserter 48, which can facilitate inserting questions (e.g., transcribed versions of detected questions) and corresponding answers related to the video represented by video bitstream 12. For example, Q&A inserter 48 may permit the viewer to type out the question heard or seen in the video along with his or her own answer to the question. In other words, the viewer can listen to the detected question and transcribe it appropriately. In some cases, question analyzer 40 and/or transcriber 42 may not capture the questions sufficiently accurately. Having a human interpret and type the questions may enable higher accuracy.

The viewer may also record his or her answer by audio or video and upload the recorded answer (e.g., in a form of an audio or video file) to Q&A inserter 48. An attacher 50 may attach the recorded answer to video signal 32 at the location of the question. In an example application, another viewer searching for video segments relating to the question may be able to view (or hear) the viewer's recorded answer on the display portal.

In some embodiments, user interaction module 46 may include a crowd sourcer 52 that can crowdsource the question by a plurality of users. As used herein, the term "crowdsource" can include outsourcing a task (e.g., typing the question) to a plurality of users, who form an undefined group (e.g., social network, viewer community, etc.). User interaction 44 from the plurality of users may be received at video/audio analyzer 20. User interaction 44 may include typed questions and answers corresponding to the questions in the video represented by video bitstream 12.

Crowdsourcing includes a distributed problem-solving and production model. In an example embodiment, the videos may be broadcast to an unknown group of users in the form of an open call for solutions. Viewers—also known as the crowd—may submit solutions by typing in the questions. Such collaborative effort can be leveraged to increase accuracy of question detection in media processing system 10.

The questions may be combined with a search interface 54 that can interface with storage 22, which stores a plurality of video segments 56, questions 58, and answers 60. In various embodiments, storage 22 may include any suitable database, hard disk drive, or other memory element. Storage 22 may include an organized set of video segments 56 tagged appropriately, and categorized into various categories and levels according to the questions and answers found therein.

Video segments 56 may include tagged video segments, coded as I-frames. Video segments 56 may be associated with questions 58, and answers 60 appropriately. For example, a specific video segment may include a question and a corresponding answer. The video segment may be tagged with the question and the answer. The video segment, the question, and the answer may be stored separately in storage 22, for ease of searching; nevertheless, the video segment, the question and the answer may be associated in some manner. In response to a search query for a specific question, storage 22 may retrieve the question, and its corresponding answer and the video segment.

In some embodiments, instead of storing entire video files, storage 22 may store portions thereof, corresponding to video segments 56 that are tagged with questions. The tagged video segments 56 may be associated with the corresponding parent video files (stored elsewhere) from which the tagged video segments 56 were extracted. In response to a search query, the viewer may be shown the tagged video segments 56. When the viewer selects a particular segment for viewing, the parent video file may be pulled up from its storage location and displayed appropriately.

In another embodiment, the viewer may enter a search query for a specific question in search interface 54. Appropriate video segments 56 marked with the search question may be retrieved from storage 22 in response. In some embodiments, the detected questions may be correlated to other questions 58 (e.g., having similar keywords) stored in storage 22. Thus, substantially all video segments 56 that contain related questions 58 may be returned as possible videos of interest in response to the search query in search interface 54. In yet another embodiment, substantially all video segments 56 corresponding to that question, related questions 58, and related answers 60 may also be retrieved in response to the search query. In yet another embodiment, the answer to the detected question may be correlated with related answers 60 (e.g., having similar keywords, pertaining to the same topic, etc.) and video segments corresponding to related answers 60 (and the answer to the detected question)

In various embodiments, video/audio analyzer 20 may cluster related questions 58 and related answers 60 along with video segments 56 that may be relevant to the specific question in a search query. In various embodiments, the clustered questions and answers may be displayed to the viewer on the same portal as the video segment. For example, the clusters may appear in a "frequently asked question" (FAQ) section of the portal.

In various embodiments, video/audio analyzer 20 may include a question counter 62. Question counter 62 may count the number of questions in the video represented by video bitstream 12. The number of questions may be fed to an interest analyzer 64. The resulting number of questions may be used as a measure of interest for the video. The number of questions may also be used as data for a speaker or content creator to measure the engagement of his or her audience. Various other statistics related to the questions (e.g., number of users who typed in questions, number of users who uploaded audio or video files related to the answers, etc.) may also be generated by interest analyzer 64.

In various embodiments, video segments 56 that correspond to questions may be searched for, retrieved, and viewed. The location of questions in the video can be marked with tagger 38, so that viewers can navigate (e.g., by clicking the tags, selecting the question, etc.) to corresponding questions without viewing the entire video file. The marked video signal 32 and audio signal 30 may be combined and encoded (e.g., convert analog signal into digital signal) by media encoder 66. The marked video segments may be coded as I-frames by I-frame coder 67.

A processor 68 and a memory element 69 in video/audio analyzer 20 may enable the operations described herein. Embodiments of media processing system 10 may enable detecting the segments of the video that correspond to questions. The questions, and corresponding answers, may be correlated and video segments may be efficiently searched and consumed based on related questions and/or answers.

Figure 3:
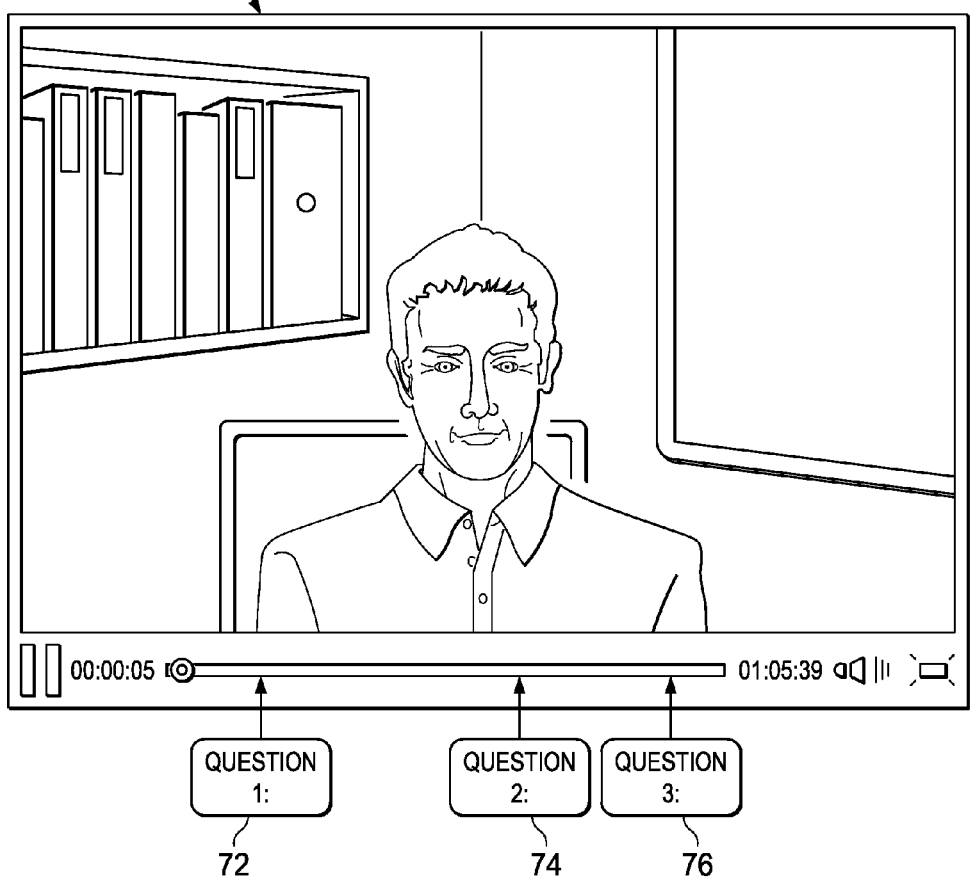
FIG. 3 is a simplified diagram illustrating further example details of an embodiment of the media processing system.

Turning to FIG. 3, FIG. 3 is a simplified diagram illustrating an example detail of an embodiment of media processing system 10. A video 70 may be marked with example questions 72 (question 1), 74 (question 2) and 76 (question 3). In some embodiments, the tags may be visibly indicated when video 70 is displayed on a portal. For example, the tags may be visibly indicated as color-coded bars, or arrows, or triangles, or such other identifying marks. The viewer may select questions 72, 74, or 76, and the display may change correspondingly to show the video segment marked with the selected question.

In other embodiments, the tags may be invisible, but questions 72, 74, and 76 may be visible and selectable. For example, the viewer can select question 72 (e.g., by clicking thereon) and the video display may switch to the corresponding segment. In yet other embodiments, the tags and corresponding questions 72, 74 and 76 may be visible and selectable. Note that only three example questions are illustrated in the FIGURE, for ease of illustration. Any number of questions may be marked in video 70 within the broad scope of the embodiments.

Figure 4:
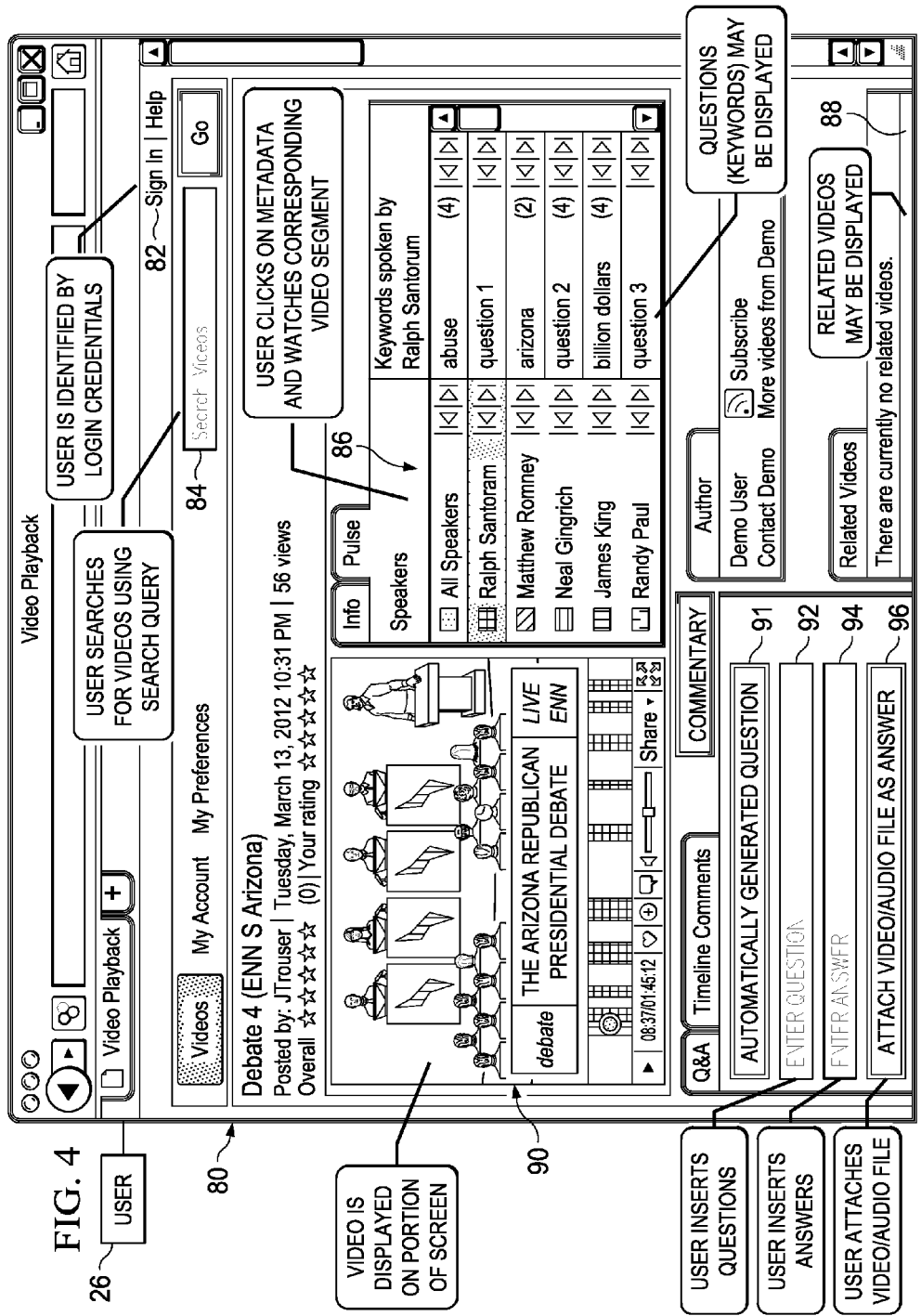
FIG. 4 is a simplified diagram illustrating an example screen shot of an embodiment of the media processing system.

Turning to FIG. 4, FIG. 4 is a simplified representation of an example screen shot of an interactive portal 80 according to an embodiment of media processing system 10. Interactive portal 80 may allow the viewer to conveniently and quickly browse, search, and view content interactively. When video bitstream 12 is played on portal 80, the corresponding video may be displayed therein with various interactive options.

In some embodiments, interactive portal 80 may be displayed on a screen of an example user 26 through a web browser. In other embodiments, interactive portal 80 may be part of an application (e.g., mobile app) installed on user 26. Various other implementations of interactive portal 80 are included within the broad scope of the embodiments.

In some embodiments, browsing may be configured based on the user's profile (e.g., MAC address, viewer preferences, etc.) obtained through the user's login credentials via login link 82. In example interactive portal 80, videos can be located by content category, title, keyword, or other metadata by typing the search query in a search field 84. In some embodiments, search field 84 may be associated with search interface 54 of video/audio analyzer 20. Viewers can type in questions to search for video files and access advanced search options (e.g., filters) to further refine content searches.

Metadata such as keywords, transcribed questions, and speaker identities may be displayed in a portion 86, to navigate content within the video. For example, a question (or its corresponding keyword) may be displayed in portion 86, and clicking on the question can trigger a switch to the corresponding video segment on portal 80. The specific video segment where the question was asked may be retrieved by clicking on or otherwise selecting the question in portion 86.

In various embodiments, the video may contain multiple questions, and the question may even occur multiple times in the video. Questions may be tagged (e.g., marked) automatically according to their respective locations in the video. Related videos (e.g., related to the search query, or related according to content, or other metadata) may be displayed in a portion 88. The video segment may be displayed in a video display portion 90.

Questions, including detected questions may be displayed in a Q&A section of portal 80. For example, detected questions may be transcribed and displayed in an automatically generated question field 91. Viewers can also enter questions and answers in a field 92. For example, detected questions may be transcribed and inserted (e.g., typed) in field 92 manually by the viewer. The inserted questions may comprise transcribed versions of detected questions corresponding to the tags. In an example embodiment, when the viewer clicks on a tag corresponding to a detected question, the Q&A section of portal 80 may pop up, displaying field 92 to permit transcribed questions corresponding to the tagged question to be entered appropriately. Any questions entered in field 92 may be appropriately associated with the tag and/or detected question. Answers may be inserted in field 94. The answers may also be associated with corresponding tags and/or detected questions in a suitable manner.

Viewers may be able to attach an audio file or video file as an answer by selecting field 96. Field 96 may interface with attacher 50 in video/audio processing analyzer 20. Fields 92, 94 and 96 may interface with Q&A inserter 48. Clusters of related questions and answers may also be included in portal 80, for example, in the Q&A section. The clustered questions and answers may be a clickable list of questions (e.g., displaying a portion of the questions), or a list of topics, etc., categorized suitably, according to various configuration needs. In some embodiments, the clustered questions and answers may also provide links to related videos (e.g., in related videos portion 88).

When video bitstream is played on portal 80, and locations of the questions are reached during the playing, the questions may be displayed on portal 80, for example, in, or near field 92. Corresponding answers may also be displayed appropriately. Links to recorded answers by other viewers may also be displayed, allowing the viewer to click on the links and view the other viewers' recorded answers.

In example embodiments, viewers can comment on the video and the commentary may be placed in appropriate commentary field and timeline comments field in portal 80. Page comments can be created for general commentary and timeline comments can be placed at any point in the video timeline for topical discussions. The comments may be incorporated in the metadata of the video. Supplemental information, such as tickers, further reading, Web sites, and downloadable materials may also be displayed on interactive portal 80.

Figure 5:
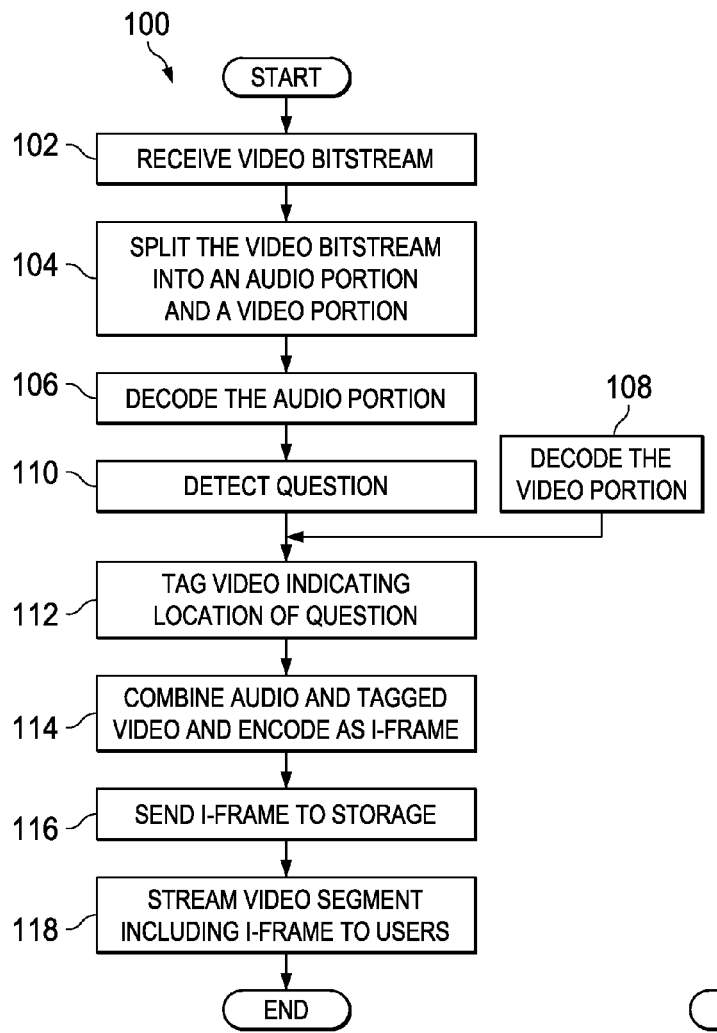
FIG. 5 is a simplified flow diagram illustrating example operations that may be associated with an embodiment of the media processing system.

Turning to FIG. 5, FIG. 5 is a simplified flow diagram illustrating example operations that may be associated with embodiments of media processing system 10. Operations 100 may include 102, at which video bitstream 12 may be received. At 104, video bitstream 12 may be split into an audio portion, and a video portion. At 106, the audio portion may be decoded into audio signal 30. At 108, the video portion may be decoded into video signal 32.

At 110, a question may be detected in audio signal 30 by question detector 34. At 112, video signal 32 may be marked by tagger 38 with a tag indicating a location of the question in video signal 32. At 114, audio signal 30 and marked video signal 32 may be combined and coded as a I-frame by I-frame coder 67. The I-frame may represent the tagged portion of the video signal, and may facilitate searching and viewing the video appropriately. For example, the I-frame may represent a portion of the video just before the tag, and include a portion of the video after the tag, thereby facilitating viewing the video segment including the question and associated portions thereof. In some embodiments, the I-frame may represent the start of the question. At 116, video/audio analyzer 20 may send the I-frame to storage 22. At 118, the video segment including the I-frame may be streamed to users 26 via streaming server 24. Operations 110-118 may repeat for each question detected in video bitstream 12.

Figure 6:
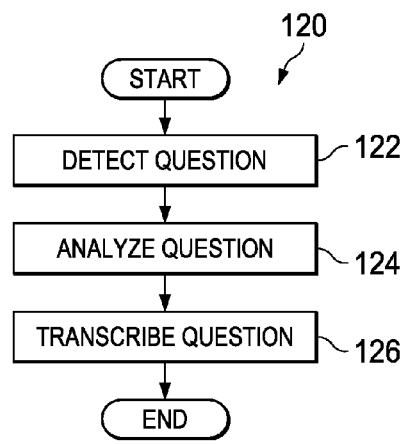
FIG. 6 is a simplified flow diagram illustrating other example operations that may be associated with an embodiment of the media processing system.

Turning to FIG. 6, FIG. 6 is a simplified flow diagram illustrating example operations that may be associated with embodiments of media processing system 10. Operations 120 may include 122, at which a question may be detected. At 124, the question may be analyzed (e.g., for content by looking at keywords). At 126, the question may be transcribed appropriately.

Figure 7:
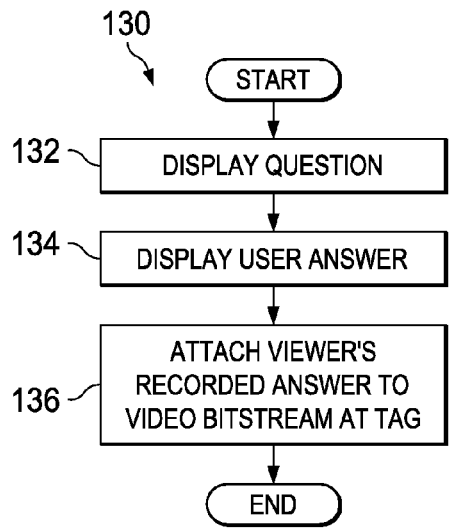
FIG. 7 is a simplified flow diagram illustrating yet other example operations that may be associated with an embodiment of the media processing system.

Turning to FIG. 7, FIG. 7 is a simplified flow diagram illustrating example operations that may be associated with an example embodiment of media processing system 10. Operations 130 may include 132, at which a question, including an automatically generated question (e.g., automatically transcribed question) and a user question (e.g., question inserted by a viewer corresponding to a detected question) may be displayed on interactive portal 80 (e.g., in field 92). At 134, a corresponding user answer (e.g., answer inserted by the viewer corresponding to the detected question) may be displayed on interactive portal 80 (e.g., in field 94). At 136, the viewer's recorded answer may be attached by attacher 50 to video bitstream 12 at the tag location.

Figure 8:
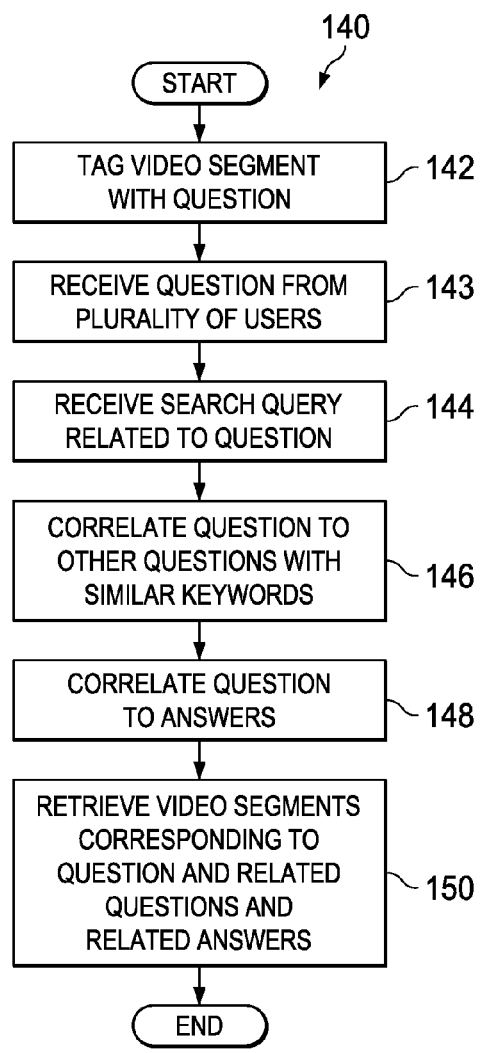
FIG. 8 is a simplified flow diagram illustrating yet other example operations that may be associated with an embodiment of the media processing system.

Turning to FIG. 8, FIG. 8 is a simplified flow diagram illustrating example operations that may be associated with an embodiment of media processing system 10. Operations 140 may include 142, at which the video segment may be tagged with a detected question. At 143, a transcription of the detected question may be received from a plurality of users 26. For example, different viewers may type in the question in field 92 on their respective portals. At 144, a search query related to the question may be received. At 146, the question may be correlated to other questions 58 with similar keywords in storage 22. At 148, the question may be correlated to answers 60 in storage 22. At 150, video segments 56 corresponding to the question and related questions 58 and related answers 60 may be retrieved.

Figure 9:
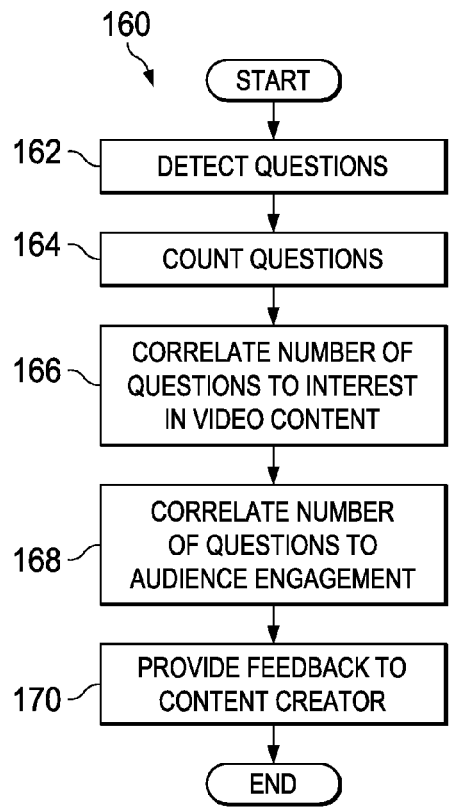
FIG. 9 is a simplified flow diagram illustrating yet other example operations that may be associated with an embodiment of the media processing system.

Turning to FIG. 9, FIG. 9 is a simplified flow diagram illustrating example operations that may be associated with an embodiment of media processing system 10. Operations 160 may include 162, at which a plurality of questions may be detected. At 164, the number of questions may be counted. At 166, the number of questions may be correlated to interest in the video content. For example, higher number of questions may correlate to higher interest. At 168, the number of questions may be correlated to audience engagement. For example, higher number of questions may correlate to increased audience engagement. At 170, feedback regarding the interest and audience engagement may be provided to the content creator.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an "application" as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the media processing activities may be implemented in video/audio analyzer 20. In some embodiments, one or more of these features may be implemented in hardware, provided external to these elements, or consolidated in any appropriate manner to achieve the intended functionality. The various elements (e.g., demux 14, video/audio analyzer 20, streaming server 24, etc.) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the network elements of FIG. 1 (e.g., video/audio analyzer 20) described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities.

In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 69, storage 22) can store data used for the operations described herein. This includes the memory element being able to store instructions (e.g., software, logic, code, etc.) in non-transitory media, such that the instructions are executed to carry out the media processing activities described in this Specification.

A processor can execute any type of instructions associated with the data to achieve the operations detailed herein in this Specification. In one example, processors (e.g., processor 68) could transform an element or an article (e.g., data) from one state or thing to another state or thing. In another example, the media processing activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in media processing system 10 could be provided in any database, register, table, cache, queue, control list, or storage structure, based on particular needs and implementations, all of which could be referenced in any suitable timeframe.

Any of the memory items discussed herein should be construed as being encompassed within the broad term "memory element." Similarly, any of the potential processing elements, modules, and machines described in this Specification should be construed as being encompassed within the broad term "processor."

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular information exchanges involving video processing, media processing system 10 may be applicable to other media processing, such as audio processing alone. Moreover, although media processing system 10 has been illustrated with reference to particular elements and operations that facilitate the processing process, these elements, and operations may be replaced by any suitable architecture or process that achieves the intended functionality of media processing system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    receiving a video bitstream in a network environment;
    decoding an audio portion of the video bitstream;
    automatically detecting a question in the decoded audio portion of the video bitstream;
    marking a segment of the video bitstream with a tag corresponding to a location of the automatically detected question in the video bitstream, wherein the tag can facilitate consumption of the video bitstream;
    receiving a search query seeking the automatically detected question; and
    returning the segment marked with the tag.

2. The method of claim 1, further comprising:
    detecting keywords in the question; and
    combining the keywords to determine a content associated with the question.

3. The method of claim 1, further comprising:
receiving the question and a corresponding answer from a user interaction.

4. The method of claim 3, further comprising:
attaching at least one of an audio file and a video file to the video bitstream at the location of the question, wherein the audio file and the video file are associated with the corresponding answer.

5. The method of claim 1, further comprising:
crowdsourcing the question by a plurality of users.

6. The method of claim 1, further comprising:
correlating the question to other questions with similar keywords; and
returning a plurality of segments corresponding to the question and the other questions.

7. The method of claim 6, further comprising:
correlating an answer to the question to one or more other answers; and
returning another plurality of segments corresponding to the answer and the one or more other answers.

8. The method of claim 1, further comprising:
counting a number of questions in the video bitstream.

9. The method of claim 1, further comprising:
encoding the marked segment as an I-frame.

10. Logic encoded in non-transitory media that includes instructions for execution and when executed by a processor, is operable to perform operations comprising:
receiving a video bitstream in a network environment;
decoding an audio portion of the video bitstream;
automatically detecting a question in the decoded audio portion of the video bitstream;
marking a segment of the video bitstream with a tag corresponding to a location of the automatically detected question in the video bitstream, wherein the tag can facilitate consumption of the video bitstream;
receiving a search query seeking the automatically detected question; and
returning the segment marked with the tag.

11. The logic of claim 10, the operations further comprising:
detecting keywords in the question; and
combining the keywords to determine a content associated with the question.

12. The logic of claim 10, the operations further comprising receiving the question and a corresponding answer from a user interaction.

13. The logic of claim 10, the operations further comprising crowdsourcing the question by a plurality of users.

14. The logic of claim 10, the operations further comprising:
counting a number of questions in the video bitstream.

15. An apparatus, comprising:
a memory element for storing data;
a processor that executes instructions associated with the data;
an analyzer configured to interface with the processor and the memory element such that the apparatus is configured for:
receiving a video bitstream in a network environment;
decoding an audio portion of the video bitstream;
automatically detecting a question in the decoded audio portion of the video bitstream;
marking a segment of the video bitstream with a tag corresponding to a location of the automatically detected question in the video bitstream, wherein the tag can facilitate consumption of the video bitstream;
receiving a search query seeking the automatically detected question; and
returning the segment marked with the tag.

16. The apparatus of claim 15, wherein the apparatus is further configured for:
detecting keywords in the question; and
combining the keywords to determine a content associated with the question.

17. The apparatus of claim 15, wherein the apparatus is further configured for:
receiving the question and a corresponding answer from a user interaction.

18. The apparatus of claim 15, wherein the apparatus is further configured for:
crowdsourcing the question by a plurality of users.

19. The apparatus of claim 15, wherein the apparatus is further configured for:
counting a number of questions in the video bitstream.

* * * * *